Jan. 23, 1934.  F. J. FRANSEN  1,944,862
AXLE BENDING EQUIPMENT
Filed Feb. 2, 1931  2 Sheets-Sheet 1

F. J. FRANSEN INVENTOR.
Merrill M. Blackburn
ATTORNEY

Jan. 23, 1934.   F. J. FRANSEN   1,944,862
AXLE BENDING EQUIPMENT
Filed Feb. 2, 1931   2 Sheets-Sheet 2

F. J. FRANSEN   INVENTOR.
BY Merrill M. Blackburn
ATTORNEY

Patented Jan. 23, 1934 1,944,862

UNITED STATES PATENT OFFICE 1,944,862

AXLE BENDING EQUIPMENT

Frank J. Fransen, Rock Island, Ill., assignor to Bee Line Manufacturing Company, Davenport, Iowa, a corporation of Iowa Application February 2, 1931. Serial No. 512,851

13 Claims. (Cl. 153—32)

The present invention pertains to apparatus for use in bending automobile axles so that the wheels will have the proper inclination with respect to a horizontal line, the general purpose of the invention being illustrated by Patent No. 1,720,183 issued July 9, 1929 to J. H. Parmer and Patent No. 1,777,686 issued October 7, 1930 to W. Bagge. However, this construction is very different from either of those illustrated in the patents referred to and is considered quite an improvement thereon.

Among the objects of this invention are to provide improved apparatus for the bending of automobile axles so that the wheels will have the proper cambre; to provide in a structure for the purpose indicated an improved apparatus for holding automobile axles while force is being applied thereto to bend the same; to provide improved means for applying a bending force to an axle; and such further objects, advantages and capabilities as will hereafter appear and as are inherent in the construction disclosed herein.

My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Figure 1:
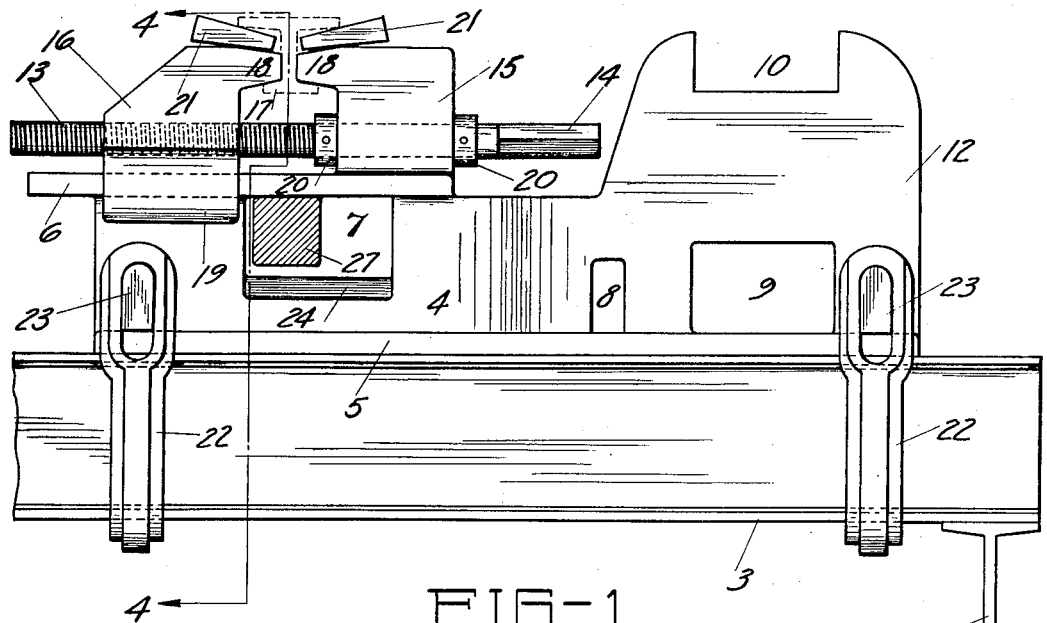
Fig. 1 is a fragmentary view of a supporting frame, with my improved apparatus shown thereon in section and elevation.

Reference will now be made in greater detail to the annexed drawings forming a part hereof for a more detailed description of the present invention. By reference to Fig. 1 it will be seen that there is a supporting frame made up of I-beams 1, 2 and 3 which are secured together at substantially right angles, as illustrated. These form the framework upon which the automobile is supported, spaced from the floor, to be worked upon. Upon the beam 3 there is placed a holding member 4 having flanges 5 and 6 upon its lower and upper edges. This holding member or plate 4 is shown as provided with apertures 7, 8, 9 and 10 and their purpose will be explained more in detail hereinafter. As indicated at 11 in Fig. 2 the plate 4 is offset laterally so that the part 12 of this plate will be out of the way of screw 13 which is provided with an angular portion 14 upon which a suitable socket wrench may be placed for the operation of the screw. Also, the lateral offsetting of the portion 12 of the plate 4 permits the screw 13 to be moved backwardly, if the fixed clamping jaw be made movable and the movable jaw be made fixed.

Figure 2:
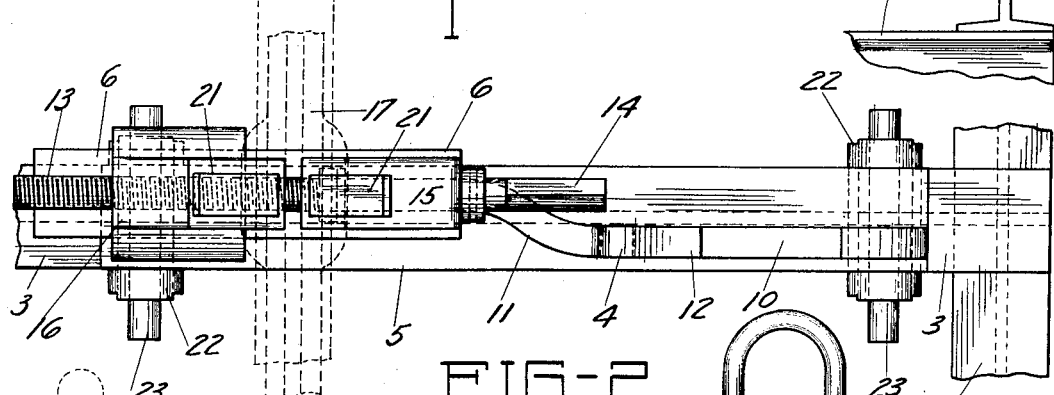
Fig. 2 is a plan view of the structure shown in Fig. 1.

Reference has just been made to such jaws as being fixed and movable. These jaws are indicated by the numerals 15 and 16, the same serving to clamp the automobile axle in place, when the jaws are tightened up. The jaw 15, as indicated above, is integral with the flange 6 or rigidly secured thereto and is provided with a nose 18 designed to engage one side of the axle 17. The jaw 16 has arms 19 at its lower edge which engage the flange 6 and hold the jaw assembled with the flange. By this arrangement the jaw is permitted to slide longitudinally of the flange and is actuated in such sliding movement by the screw 13 which is threaded in the body of the jaw. At its upper portion this jaw is provided with a nose 18 similar to the corresponding part on the jaw 15. Collars 20 are secured to the screw 13 so as to prevent longitudinal movement thereof through the body of the jaw 15. Therefore, rotation of the screw will cause motion of the jaw 16 with relation to the jaw 15. It will therefore be seen that by getting the axle 17 properly positioned between the noses 18 and turning the screw 13 in the right direction the jaws may be caused to grip the axle and hold the same in place. If the space between the flanges of the axle is not too great, the noses 18 will be wide enough to engage both the upper and lower flanges and thus prevent rocking of the axle. On the other hand, this space may be comparatively wide, as illustrated in Fig. 1, and wedges 21, or their equivalent, may be needed to fill in the space so as to more effectually prevent any rocking. Clevises 22 pass around the beam 3 and up across the edges of the flange 5. Tapered pins 23 are passed through the openings in the ends of the clevises and through openings provided therefor in member 4. These clevises 22 and pins 23 fasten the member 4 down on the I-beam 3 and prevent rocking thereof. If thought desirable, a third clevis 22 may be put around the beam 3 and have its pin 23 pass through the opening 8 in member 4, thus furnishing additional securing means for fastening member 4 to the I-beam.

Figures 7, 8:
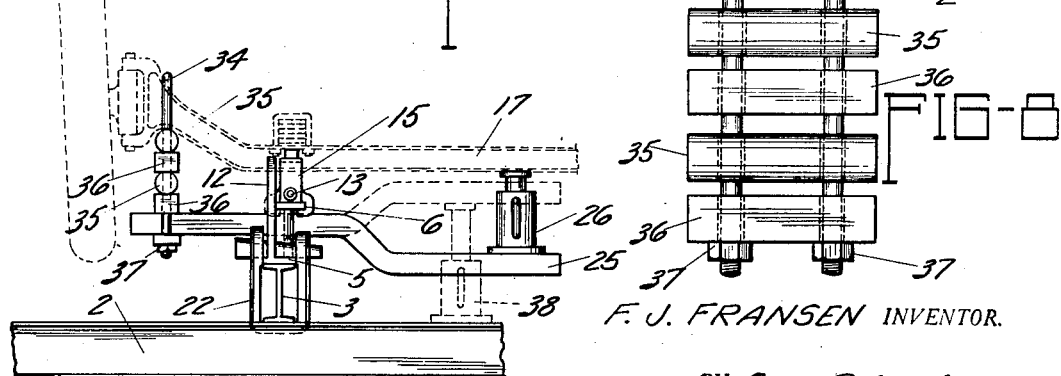
Fig. 7 is a fragmentary elevation showing a modified form of force applying tool.
Fig. 8 is an enlarged elevation at right angles to the plane of Fig. 7 illustrating a part of the structure shown in that figure.

The lower edge of opening 7 is bevelled on both sides as indicated at 24 to form a somewhat wedge shaped face upon which the lever 25 may rock when used as illustrated in Fig. 7. When the jack 26 is positioned below the lever, as illustrated in Fig. 3, the lever will not rock upon the part 24 but will rest against the under face of the flange 6, as illustrated in Fig. 1.

The notches 9 and 10 serve as seats for a crossbar of suitable size which may be mounted therein to function as an abutment against which a jack may rest when it is desired to exert pressure in a horizontal direction against an axle so as to correct unintentional bends in a horizontal direction. If it is desired to exert pressure horizontally against an outer end portion of an axle, a bar may be put in an opening 9 of one member 4 and in an opening 10 of the other member and its upper end portion will then be opposite the end of the axle and a jack placed between the two can exert a horizontal thrust against the axle to cause bending thereof in a horizontal direction. It will be found most convenient to jack up the front end of the car as illustrated in Fig. 3, when working upon the axle with my construction.

Figure 3:
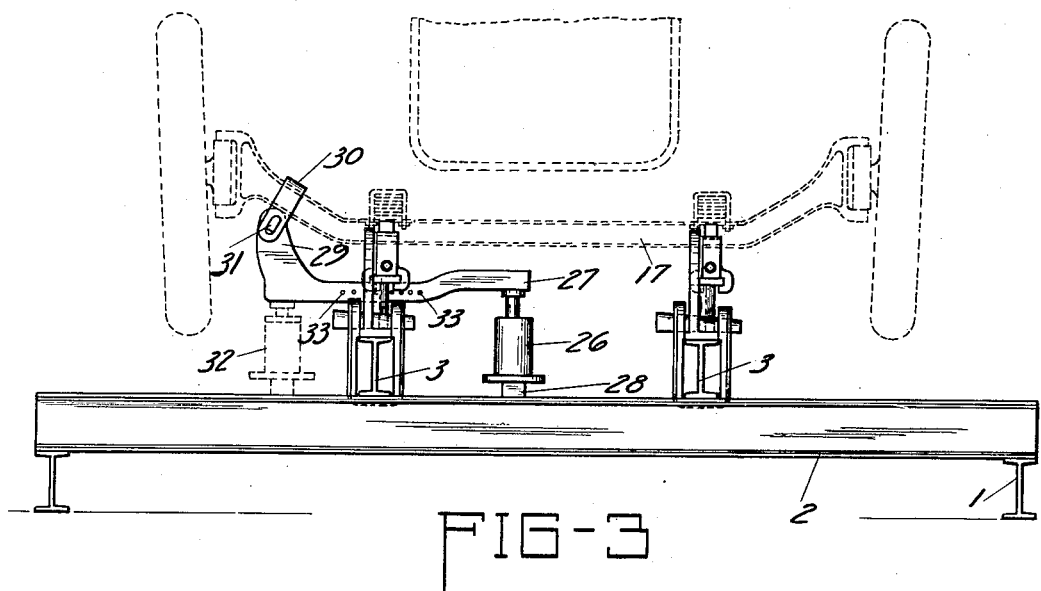
Fig. 3 is a front elevation of the supporting frame having a pair of devices in accordance with my invention supported thereon and having the front end of an automobile held in place thereby.
Figures 4, 5, 6:
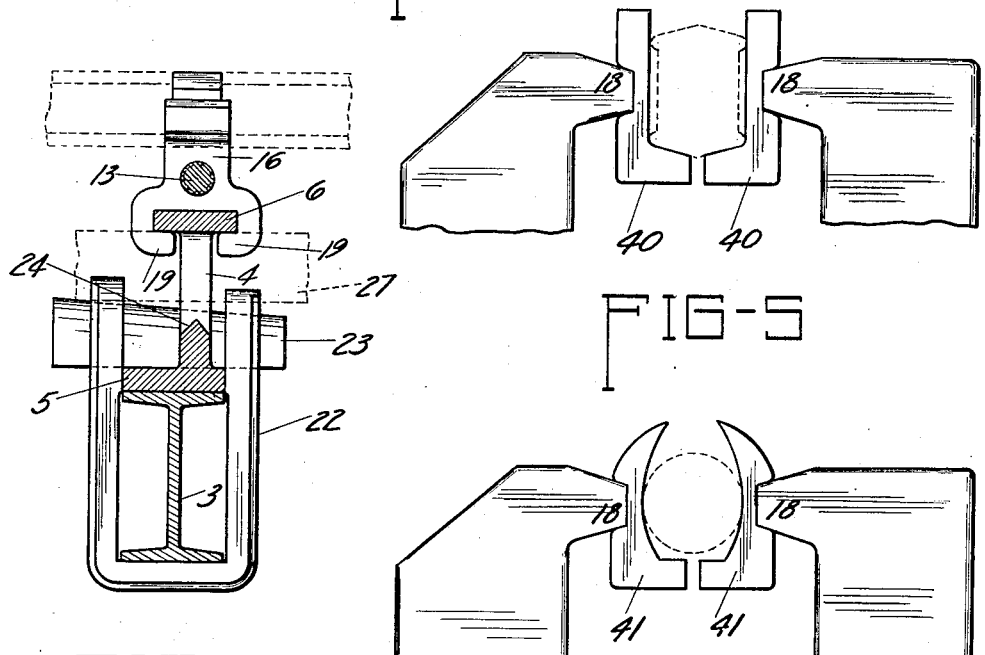
Fig. 4 is a transverse section substantially along the broken plane indicated by the line 4—4, Fig. 1.
Fig. 5 is a fragmentary view showing a modified form of holding means for an automobile axle.
Fig. 6 is a view similar to Fig. 5 but showing a further modified form of holding means.

Figs. 3 and 7 illustrate two different apparatuses by means of which force may be exerted to bend an axle in a vertical direction. The bar 27 of Figs. 1, 3 and 4 is similar to the bar 25 of Fig. 7 and performs the same function but is somewhat different in shape. As illustrated in Fig. 3, this bar has a slight upward bend at one end to make more room for a jack to be placed between said bar and a bar 28 which bridges the space between two I-beams 2. This bar 27 has at its opposite end an upwardly directed extension 29, connected with a clevis 30 which is placed around the axle 17 and connected to the extension 29 by a pin 31. By this arrangement, a downward pull may be exerted upon the end of the axle 17 by causing the jack 26 to exert an upward thrust against the opposite end of the bar or lever 27. If it is desired to bend the outer end of the axle upwardly, this may be done by placing the jack 26 in the position indicated in dotted lines at 32. Extension of the jack in this position pushes upwardly on the outer end of the lever 27 and force is therefore transmitted in an upward direction to the axle 17, causing upward bending thereof. A series of openings 33 are provided in the lever 27 so that pins may be passed therethrough to position this lever with relation to the member 4.

Cooperating with the bar 25, as illustrated in Fig. 7, is a clevis 34 upon which may be mounted as many crosspieces 35 and 36 as may be necessary to fill up the space between the end of the lever 25 and the end of the axle 17. As illustrated in Fig. 7, the nuts 37 are tightened up until the crossbar 35 is forced into engagement with the under side of the axle 17. Therefore, when jack 26 forces the end of lever 25 downwardly the crosspiece 35 will be forced against the end of axle 17 and will cause the same to be bent upwardly. It will of course be understood that notches may be formed in the sides of bar 25 to prevent the same from slipping with relation to the clevis 34, if desired. Also, if an especially wide bar 25 is used, it may be necessary to have perforations therethrough to receive the arms of the clevis 34. In order to adapt the device for bending the axle downwardly, it is only necessary to turn the bar or lever 25 through 180 degrees so that its inner end will occupy the dotted line position illustrated in Fig. 7, with the jack 26 in the position indicated by dotted lines at 38. An upward thrust exerted by the jack 38 will then cause a downward pull on the clevis and this will exert a downward pull against the axle causing the same to be bent in this direction.

Figure 9:
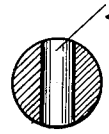
Fig. 9 is a transverse section of a part of the structure shown in Fig. 8.

Fig. 9 illustrates a cross section of a bar 35 in the plane of the axis of one side of the clevis 34, showing the shape of the bar 35, in cross section. This also illustrates the opening 39 through which an arm of the clevis 34 passes.

Different forms of holding members 40 and 41 cooperating with the jaw noses 18 in the holding of different shaped axles or bars are shown in Figs. 5 and 6. It is not believed that detailed description of these is necessary in view of the foregoing description.

It is obvious from the annexed drawings and the foregoing description that I have provided apparatus capable of accomplishing the various objects set forth above.

Having now described my invention, I claim:

1. In apparatus for the purpose specified, a beam, a holding unit to be mounted on said beam, said holding unit having adjustable clamping means for holding an axle, screw means for drawing said clamping means together, means for securing the holding unit to the beam, and means cooperating with the holding unit for exerting pressure against the held axle to cause bending thereof.

2. A structure as defined by claim 1 in which the axle holding means comprises a fixed jaw and an adjustable jaw on the body of the holding unit and the screw means passes through the two jaws and serves, when rotated in one direction, to draw the movable jaw toward the fixed jaw.

3. An element of an axle holding apparatus comprising a body member having transversely extending flanges along opposite edges thereof and having perforations adjacent one of said flanges whereby the body member may be secured to a frame member and a perforation for the reception of a bar whereby force may be applied to an axle, and clamping jaws by means of which an axle may be gripped to be held in place when a bending force is exerted on the axle.

4. A structure as defined by claim 3 in which one of the jaws is rigid with the body member and the other is adjustable longitudinally thereof so that it may be caused to grip the axle.

5. In a structure for the purpose indicated, an axle holding means to be secured to a supporting frame, rigidly, said axle holding means having a body member flanged upon opposite edges, one of the flanges being, in use, secured against a supporting frame, the opposite flange having a clamping jaw rigid therewith and a second clamping jaw slidable therealong into and out of clamping position, and force applying means for causing the second jaw to move toward and from the first jaw.

6. A structure as defined by claim 5 having an aperture therein for the reception of a bar whereby a bending force may be transmitted to a held axle and apertures for the reception of a bar serving as an abutment, and a bending bar in the first named aperture for transmitting bending force to an axle held by the jaws.

7. In means for the purpose specified, a body member having a thin, flat, upright portion, a second portion connected to the first portion and offset laterally with relation thereto, means on the first named portion whereby clamping jaws are supported, a fixed jaw carried by said means, a second jaw carried by said means and slidable along the same, and a screw passing through said jaws and adapted to move the second jaw with relation to the first one, the axis of said screw being offset laterally with relation to the plane of said second portion.

8. In means for the purpose specified, a body member having a plane portion, a second portion connected to the first portion and offset with relation thereto, means on the first named portion whereby clamping jaws are supported, a fixed jaw carried by said means, a second jaw carried by said means and slidable along the same, and a screw fastened through said jaws and adapted to move the second jaw with relation to the first one, the second portion of the body member having an upward extension to receive an abutment bar, said extension being offset laterally with relation to the axis of the screw to permit a socket wrench to be applied to said screw for operation thereof.

9. In a structure for the purpose indicated, an axle holding member to be mounted on a supporting frame and to rigidly clamp an axle, said holding member having an aperture therein for the reception of a bending bar, a bending bar in said aperture extending in substantially the same direction as the axle and engaging one of the enclosing walls of the aperture to rock thereon, and force applying means to cause said bar to exert a bending force on said axle.

10. In a structure for the purpose indicated, an axle holding member to be mounted on a supporting frame and to rigidly clamp an axle, said holding member having an aperture therein for the reception of a bending bar, a bending bar in said aperture extending in substantially the same direction as the axle, said bending bar having one end offset with relation to the other end so as to provide sufficient space between the axle and the offset end for the insertion and operation of force applying means, and force applying means to cause said bar to exert a bending force on said axle.

11. In a structure for the purpose indicated, an axle holding member to be mounted on a supporting frame and to rigidly clamp an axle, said holding member having an aperture therein for the reception of a bending bar, a bending bar in said aperture extending in substantially the same direction as the axle, said bending bar having a lateral extension adjacent one end to be attached to a portion of an axle, and force applying means to cause said bar to exert a bending force on said axle.

12. In a structure for the purpose indicated, an axle holding member to be mounted on a supporting frame and to rigidly clamp an axle, said holding member having an aperture therein for the reception of a bending bar, a bending bar in said aperture extending in substantially the same direction as the axle, force applying means to cause said bar to exert a bending force on said axle, and a clevis to connect one end of the bending bar to the axle, and a plurality of spacer blocks arranged between the bar and the axle.

13. A structure for the purpose indicated comprising a pair of axle holding members to be mounted on substantially parallel frame members and to support the front end of an automobile spaced away from the frame, said axle holding members extending approximately parallel with the automobile and each comprising a body member, means for securing the same to the frame, and clamping jaws on the body member relatively adjustable toward and away from each other, longitudinally of the automobile, for holding an axle, in combination with means mounted in a body member to assist in applying a bending force to an axle, and a clevis to connect the last named means to the axle to be bent.

FRANK J. FRANSEN.